United States Patent
Oshita et al.

(10) Patent No.: US 10,920,708 B2
(45) Date of Patent: Feb. 16, 2021

(54) FUEL-SAVING CONTROL DEVICE AND FUEL-SAVING CONTROL METHOD

(71) Applicant: ISUZU MOTORS LIMITED, Tokyo (JP)

(72) Inventors: Wasantha Oshita, Fujisawa (JP); Tomohiko Takeda, Machida (JP); Katsunori Kikuchi, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 13 days.

(21) Appl. No.: 16/341,404

(22) PCT Filed: Oct. 11, 2017

(86) PCT No.: PCT/JP2017/036732
§ 371 (c)(1),
(2) Date: Apr. 11, 2019

(87) PCT Pub. No.: WO2018/070395
PCT Pub. Date: Apr. 19, 2018

(65) Prior Publication Data
US 2020/0040836 A1  Feb. 6, 2020

(30) Foreign Application Priority Data

Oct. 12, 2016  (JP) .............................. JP2016-200897

(51) Int. Cl.
*F02D 41/30*  (2006.01)
(52) U.S. Cl.
CPC ...... *F02D 41/3005* (2013.01); *F02D 2200/50* (2013.01); *F02D 2200/602* (2013.01); *F02D 2200/701* (2013.01); *F02D 2200/702* (2013.01)
(58) Field of Classification Search
CPC ............. F02D 41/3005; F02D 2200/50; F02D 2200/602; F02D 2200/701;
(Continued)

(56) References Cited

U.S. PATENT DOCUMENTS

| 5,754,968 A | * | 5/1998 | Hedstrom | ............. | B60W 10/06 477/121 |
| 2008/0168964 A1 | * | 7/2008 | Kimura | ................. | F02D 41/021 123/325 |

(Continued)

FOREIGN PATENT DOCUMENTS

| EP | 1382477 A1 | 1/2004 |
| JP | 2008-115814 A | 5/2008 |

(Continued)

OTHER PUBLICATIONS

Extended European Search Report for related EP App No. 17860250.4 dated Oct. 18, 2019, 8 pgs.

(Continued)

*Primary Examiner* — Joseph J Dallo
(74) *Attorney, Agent, or Firm* — Procopio, Cory, Hargreaves & Savitch LLP

(57) ABSTRACT

A fuel-saving control device equipped with: a surplus drive force calculation unit for calculating surplus drive force; a fuel-saving control unit for executing a fuel-saving control which lowers and corrects the indicated fuel injection amount according to the accelerator position when the surplus drive force reaches or exceeds a threshold, and stopping the fuel-saving control when the surplus drive force falls below the threshold; a vehicle position detection unit for detecting the vehicle position; a map information storage unit for storing map information; a downshift operation detection unit for detecting a downshifting operation; and a forward gradient identification unit for identifying the forward gradient on the basis of the vehicle position and the map information. Therein, the fuel-saving control unit stops the fuel-saving control when a downshifting operation is detected and the forward gradient is an uphill grade equal to or greater than a threshold.

7 Claims, 3 Drawing Sheets

(58) Field of Classification Search
CPC ........ F02D 2200/702; B60W 2520/30; B60W 2530/16; B60W 2540/10; B60W 2540/16; B60W 2552/15; B60W 10/04; B60W 10/06; B60W 10/11; B60W 30/182; F16H 61/02
See application file for complete search history.

(56) References Cited

U.S. PATENT DOCUMENTS

| | | | |
|---|---|---|---|
| 2010/0121549 A1 | 5/2010 | Fukuda et al. | |
| 2011/0169323 A1 | 7/2011 | Tseng et al. | |
| 2013/0282245 A1* | 10/2013 | Dietzel | B60W 10/06 701/60 |
| 2015/0322873 A1 | 11/2015 | Chen et al. | |
| 2016/0121755 A1 | 5/2016 | Nishiyama et al. | |
| 2016/0303947 A1* | 10/2016 | Lu | B60H 1/3208 |
| 2020/0040836 A1* | 2/2020 | Oshita | B60W 10/04 |

FOREIGN PATENT DOCUMENTS

| | | |
|---|---|---|
| JP | 2010-280334 A | 12/2010 |
| JP | 2011-099394 A | 5/2011 |
| JP | 2012-076700 A | 4/2012 |
| JP | 2015-102032 A | 6/2015 |
| JP | 2016-061177 A | 4/2016 |
| JP | 2016-086612 A | 5/2016 |

OTHER PUBLICATIONS

International Search Report and Written Opinion for related International Application No. PCT/JP2017/036732, dated Dec. 19, 2017; English translation of ISR provided; 8 pages.

* cited by examiner

FUEL-SAVING CONTROL DEVICE AND FUEL-SAVING CONTROL METHOD

CROSS-REFERENCE TO RELATED APPLICATIONS

This application is a U.S. National Stage entry of PCT Application No: PCT/JP2017/036732 filed on Oct. 11, 2017, which claims priority to Japanese Patent Application No. 2016-200897, filed Oct. 12, 2016, the contents of which are incorporated herein by reference.

TECHNICAL FIELD

The present disclosure relates to a fuel-saving control device and a fuel-saving control method.

BACKGROUND ART

A fuel-saving control is widely known, in which, while a vehicle is traveling with an instructed fuel injection amount corresponding to an accelerator position, the instructed fuel injection amount is intentionally lowered and corrected when a surplus driving force becomes equal to or greater than a threshold value, thereby reducing an actual fuel consumption of an engine (e.g., see PTL 1). By executing the fuel-saving control, an accelerating force of the vehicle is limited. However, when the surplus driving force becomes smaller than the threshold value or a kickdown operation is detected, the fuel-saving control is stopped. As a result, a driver is hardly influenced by the limited accelerating force of the vehicle, and convenience of the driver is prevented from being greatly impaired due to execution of the fuel-saving control.

In addition to PTL 1, examples of the related art related to the fuel-saving control are also disclosed in PTL 2, PTL 3, PTL 4 and PTL 5.

CITATION LIST

Patent Literature

[PTL 1] JP-A-2016-061177
[PTL 2] JP-A-2010-280334
[PTL 3] JP-A-2012-076700
[PTL 4] JP-A-2015-102032
[PTL 5] JP-A-2016-086612

SUMMARY OF INVENTION

Technical Problem

As described above, the fuel-saving control is stopped when the surplus driving force becomes smaller than the threshold value. However, for example, even if the vehicle returns to a travelling state, in which the fuel-saving control is stopped after the surplus driving force had been actually decreased by the vehicle starting uphill-travelling, namely, even if the vehicle returns to travelling under a normal control, the vehicle may stall since the vehicle has already started uphill-travelling. Accordingly, the convenience of the driver may be impaired.

Accordingly, an object of the present disclosure is to provide a fuel-saving control device and a fuel-saving control method, in which a vehicle hardly stalls after starting uphill-traveling and thus convenience of a driver can be improved while maintaining a fuel-saving performance of the vehicle.

Solution to Problem

In a first aspect of the present disclosure, there is provided a fuel-saving control device, including: a surplus driving force calculation unit for calculating a surplus driving force; and a fuel-saving control unit configured to execute a fuel-saving control for lowering and correcting an instructed fuel injection amount depending on an accelerator position when the surplus driving force becomes equal to or greater than a first threshold value, and configured to stop the fuel-saving control when the surplus driving force becomes smaller than the first threshold value, characterized by further including: a vehicle position detection unit for detecting a vehicle position; a map information storage unit for storing map information; a downshifting operation detection unit for detecting a downshifting operation; and a front gradient identification unit for identifying a front gradient based on the vehicle position and the map information, and the fuel-saving control unit is configured to stop the fuel-saving control even if the surplus driving force does not become smaller than the first threshold value, when the front gradient is an ascending gradient equal to or greater than a second threshold value and the downshifting operation has been detected.

The fuel-saving control unit may be further configured to stop the fuel-saving control by decreasing a correction value under the fuel-saving control step by step or continuously as the front gradient increases, when the front gradient is the ascending gradient equal to or greater than the second threshold value and the downshifting operation has been detected.

The fuel-saving control device may further include a between-vehicle-and-gradient distance calculation unit for calculating a distance between the vehicle position and the front gradient based on the vehicle position and the map information, and the fuel-saving control unit may be further configured to continue the fuel-saving control even if the front gradient is the ascending gradient equal to or greater than the second threshold value and the downshifting operation has been detected, when a distance between the vehicle position and a gradient start position of the front gradient is equal to or greater than a third threshold value.

In a second aspect of the present disclosure, there is provided a fuel-saving control method, including: a surplus driving force calculation step for calculating a surplus driving force; a fuel-saving control execution step for executing a fuel-saving control for lowering and correcting an instructed fuel injection amount depending on an accelerator position when the surplus driving force becomes equal to or greater than a first threshold value; and a first fuel-saving control stop step for stopping the fuel-saving control when the surplus driving force becomes smaller than the first threshold value, characterized by further including: a vehicle position detection step for detecting a vehicle position; a front gradient identification step for identifying a front gradient based on the vehicle position and map information; and a second fuel-saving control stop step for stopping the fuel-saving control even if the surplus driving force does not become smaller than the first threshold value, when the front gradient is an ascending gradient equal to or greater than a second threshold value and a downshifting operation has been detected.

In the second fuel-saving control stop step, the fuel-saving control may be stopped by decreasing a correction value under the fuel-saving control step by step or continuously as the front gradient increases, when the front gradient is the ascending gradient equal to or greater than the second threshold value and the downshifting operation has been detected.

The fuel-saving control method may further include a between-vehicle-and-gradient distance calculation step for calculating a distance between the vehicle position and a gradient start position of the front gradient based on the vehicle position and the map information. Also, in the second fuel-saving control stop step, the fuel-saving control may be continued even if the front gradient is the ascending gradient equal to or greater than the second threshold value and the downshifting operation has been detected, when the distance between the vehicle position and the gradient start position of the front gradient is equal to or greater than a third threshold value.

Advantageous Effects of Invention

According to the present disclosure, the fuel-saving control device and the fuel-saving control method can be provided, in which a vehicle hardly stalls after starting uphill-traveling and thus convenience of a driver can be improved while maintaining a fuel-saving performance of the vehicle.

DESCRIPTION OF EMBODIMENTS

Hereinafter, embodiments of the present disclosure will be described with reference to the accompanying drawings.

First, a fuel-saving control device will be described.

The fuel-saving control device is mounted on an automobile traveling by transferring a driving force of an engine to a driving wheel of a vehicle.

Figure 1:
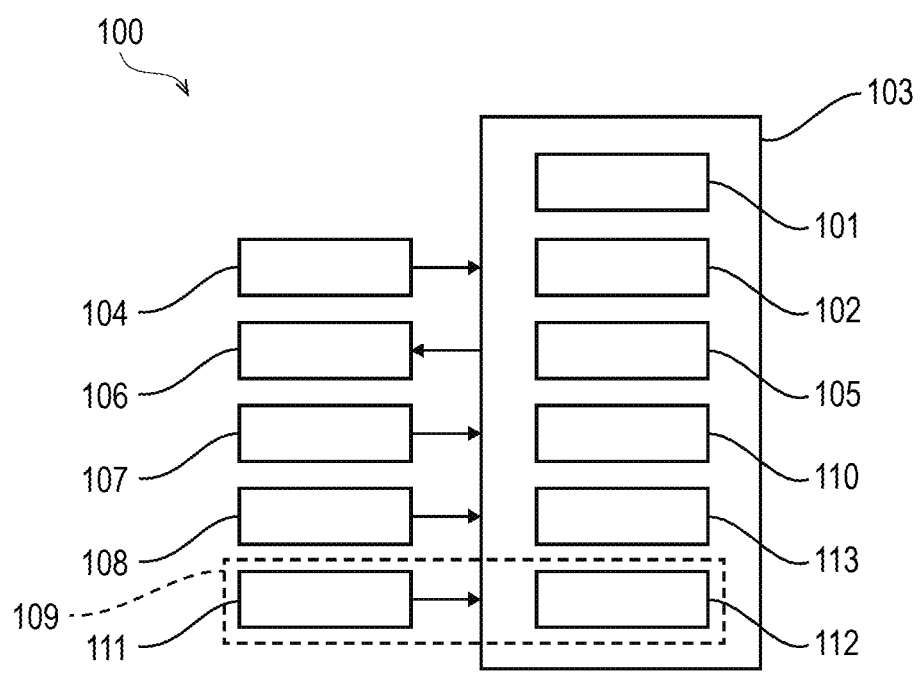
FIG. 1 is a configuration diagram of a fuel-saving control device according to an embodiment of the present disclosure.

As shown in FIG. 1, the fuel-saving control device 100 according to an embodiment of the present disclosure includes a surplus driving force calculation unit 101 for calculating a surplus driving force, and a fuel-saving control unit 102.

Typically, a vehicle travels with an instructed fuel injection amount depending on an accelerator position. However, when a surplus driving force becomes equal to or greater than a first threshold value, the fuel-saving control unit 102 executes a fuel-saving control for lowering and correcting the instructed fuel injection amount regardless of the accelerator position. Then, when the surplus driving force becomes smaller than the first threshold value, the fuel-saving control unit 102 stops the fuel-saving control.

The surplus driving force is defined by a difference between a driving force of the driving wheel and a traveling resistance on the vehicle. Also, stopping the fuel-saving control means that lowering and correcting the instructed fuel injection amount depending on the accelerator position is stopped and thus the fuel-saving control returns to a normal control.

The surplus driving force calculation unit 101 is configured to calculate a surplus driving force by calculating a difference between the driving force of the driving wheel and a travelling resistance force on the vehicle. The fuel-saving control unit 102 is configured to reduce an actual fuel consumption of the engine and thus to limit an accelerating force of the vehicle by intentionally lowering and correcting an instructed fuel injection amount, which originally depends on the accelerator position, regardless of the accelerator position, when the surplus driving force becomes equal to or greater than the first threshold value. Herein, limiting the accelerating force of the vehicle means limiting a torque of the engine, a power of the engine and/or an acceleration of the vehicle. A controller 103 gets all variables for controlling the engine with various instruments. For example, the controller 103 gets an accelerator position with an accelerator position sensor 104. Also, the controller 103 is equipped with an instructed fuel injection amount calculation unit 105 for calculating an instructed fuel injection amount depending on the accelerator position, and is configured to control a fuel injector 106 for injecting fuel into a cylinder of the engine. The fuel injector 106 is configured to inject fuel into the cylinder of the engine in accordance with the instructed fuel injection amount depending on the accelerator position.

As described above, the fuel-saving control is stopped when the surplus driving force becomes smaller than the first threshold value. However, for example, even if the fuel-saving control is stopped after the surplus driving force actually decreased due to the vehicle starting uphill-travelling, the vehicle may stall since the vehicle has already started uphill-travelling. Accordingly, the convenience of the driver may be impaired.

Therefore, the fuel-saving control device 100 further includes a vehicle position detection unit 107 for detecting a vehicle position, a map information storage unit 108 for storing map information, a downshifting operation detection unit 109 for detecting a downshifting operation, and a front gradient identification unit 110 for identifying a front gradient based on the vehicle position and the map information. Herein, the front gradient means a gradient (ascending gradient or descending gradient) between two points on a road on which the vehicle is expected to travel in the near future. The vehicle position detection unit 107 is constituted, for example, by a global positioning system receiver. The map information storage unit 108 is constituted, for example, by a storage medium separate from the controller 103. The downshifting operation detection unit 109 is constituted, for example, of a shift (gear) position sensor 111 and a shift (gear) position monitoring unit 112 for monitoring a shift (gear) position.

In the fuel-saving control device 100, the fuel-saving control unit 102 is further configured to stop the fuel-saving control even if the surplus driving force does not become smaller than the first threshold value, when the front gradient is an ascending gradient equal to or greater than a second threshold value and the downshifting operation has been detected.

Herein, the second threshold value represents a degree of an inclination relative to a horizontal plane by a numerical value and is a gradient value (%) or angle (degree).

During travelling of the vehicle under the fuel-saving control, when the front gradient is an ascending gradient smaller than the second threshold value, i.e., a gentle ascending gradient, reduction of the surplus driving force as a result of starting uphill-travelling hardly occurs, as compared with a case where the front gradient is an ascending gradient equal to or greater than the second threshold value, i.e., a steep ascending gradient. Therefore, even if the fuel-saving control is continued, the vehicle hardly stalls after starting uphill-travelling, and thus the convenience of the driver is hardly impaired.

Also, during travelling of the vehicle under the fuel-saving control, when the front gradient is a descending gradient, reduction of the surplus driving force as a result of starting downhill-travelling does not occur. Therefore, even if the fuel-saving control is continued, the vehicle hardly stalls after starting downhill-travelling, which may not impair the convenience of the driver.

Therefore, a first condition for stopping the fuel-saving control is that the front gradient is an ascending gradient equal to or greater than the second threshold value.

Further, during travelling of the vehicle under the fuel-saving control, it is necessary to check whether the driver has an intention not to want the vehicle to stall after starting uphill-travelling, thereby preventing unnecessarily stopping the fuel-saving control while disobeying the intention of the driver.

If the fuel-saving control is unconditionally stopped without considering for the intention of the driver when the front gradient is the ascending gradient equal to or greater than the second threshold value, a fuel-saving performance of the vehicle is decreased and a change in vehicle behavior, which is not intended by the driver, may also be caused. Accordingly, the convenience and safety of the driver may be impaired.

Therefore, a second condition for stopping the fuel-saving control is the time when the downshifting operation has been detected.

Also, when the front gradient is the ascending gradient equal to or greater than the second threshold value and the downshifting operation has been detected, the fuel-saving control unit 102 may be further configured to stop the fuel-saving control by decreasing a correction value under the fuel-saving control step by step or continuously as the front gradient increases. It is because, for example, in a case where the front gradient is the ascending gradient equal to or greater than the second threshold value but is small in magnitude, stalling after starting uphill-travelling can be sufficiently avoided only by slightly relaxing limitation of the accelerating force of the vehicle. Also, it is because in a case where the front gradient is the ascending gradient equal to or greater than the second threshold value but is large in magnitude, stalling after starting uphill-travelling cannot be sufficiently avoided unless limiting the accelerating force of the vehicle is largely relaxed or stopped. Therefore, stopping the fuel-saving control by decreasing a correction value under the fuel-saving control step by step or continuously as the front gradient increases allows the fuel-saving control to be continued as long as possible even if the front gradient is the ascending gradient equal to or greater than the second threshold value, thereby enhancing the fuel-saving performance of the vehicle.

Further, the fuel-saving control device 100 may further include a between-vehicle-and-gradient distance calculation unit 113 for calculating a distance between a vehicle position and a gradient start position of the front gradient based on the vehicle position and the map information. The fuel-saving control unit 102 may be further configured, when the distance between the vehicle position and the gradient start position of the front gradient is equal to or greater than a third threshold value, to continue the fuel-saving control without stopping the fuel-saving control even if the front gradient is the ascending gradient equal to or greater than the second threshold value and the downshifting operation has been detected. For example, even if the front gradient is the ascending gradient equal to or greater than the second threshold value and the downshifting operation has been detected, the fuel-saving control is uselessly stopped when the distance between the vehicle position and the gradient start position of the front gradient is equal to or greater than the third threshold value, thereby reducing the fuel-saving performance of the vehicle. Meanwhile, the third threshold value for the distance between the vehicle position and the gradient start position of the front gradient may be increased as the front gradient increases because it is considered that a longer approach running distance is required as the front gradient increases.

Next, a fuel-saving control method will be described.

Figure 2:
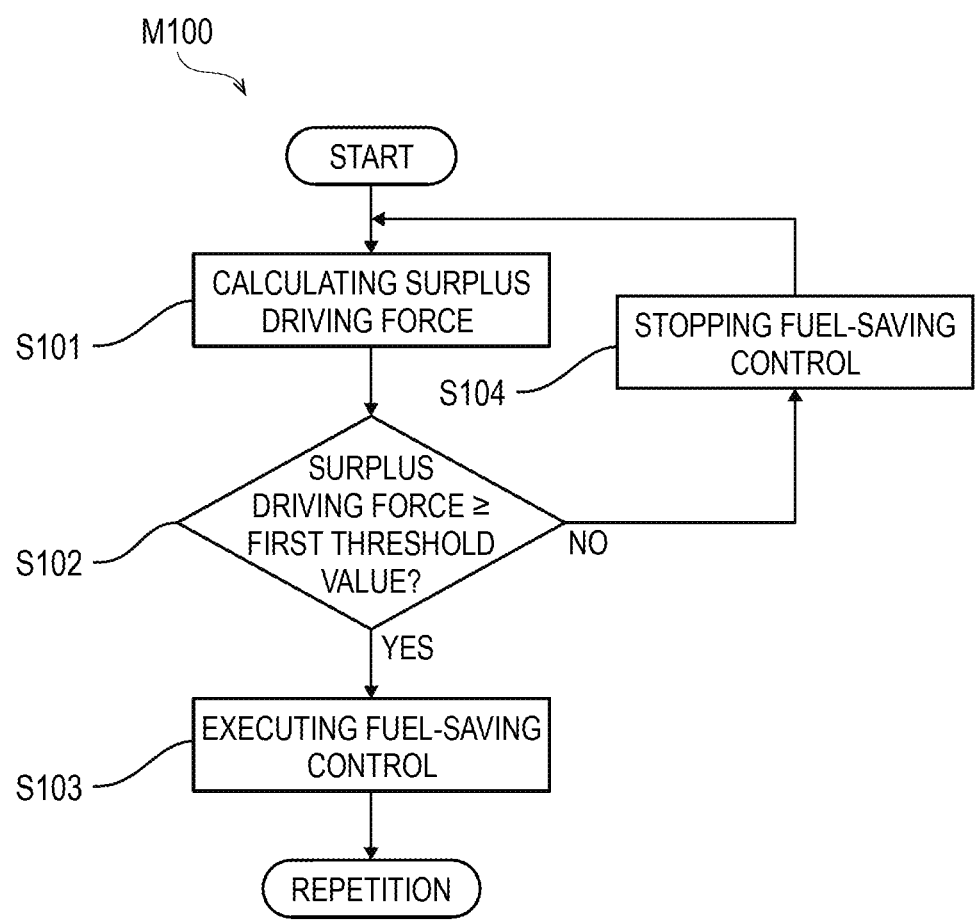
FIG. 2 is a flow chart of a basic fuel-saving control method of a fuel-saving control method according to an embodiment of the present disclosure.

As shown in FIG. 2, a fuel-saving control method according to an embodiment of the present disclosure includes a basic fuel-saving control method M100 to be executed by the fuel-saving control device 100 after an ignition key is turned on. The basic fuel-saving control method M100 includes a surplus driving force calculation step S101, a surplus driving force determination step S102, a fuel-saving control execution step S103, and a first fuel-saving control stop step S104.

In the surplus driving force calculation step S101, the surplus driving force calculation unit 101 calculates the surplus driving force. In the surplus driving force determination step S102, the fuel-saving control unit 102 determines whether the surplus driving force is equal to or greater than the first threshold value. If the surplus driving force is equal to or greater than the first threshold value, the method proceeds to the fuel-saving control execution step S103, whereas if the surplus driving force is smaller than the first threshold value, the method proceeds to the first fuel-saving control stop step S104. In the fuel-saving control execution step S103, the fuel-saving control unit 102 executes the fuel-saving control for lowering and correcting the instructed fuel injection amount depending on the accelerator position. In the first fuel-saving control stop step S104, the fuel-saving control unit 102 stops the fuel-saving control.

Figure 3:
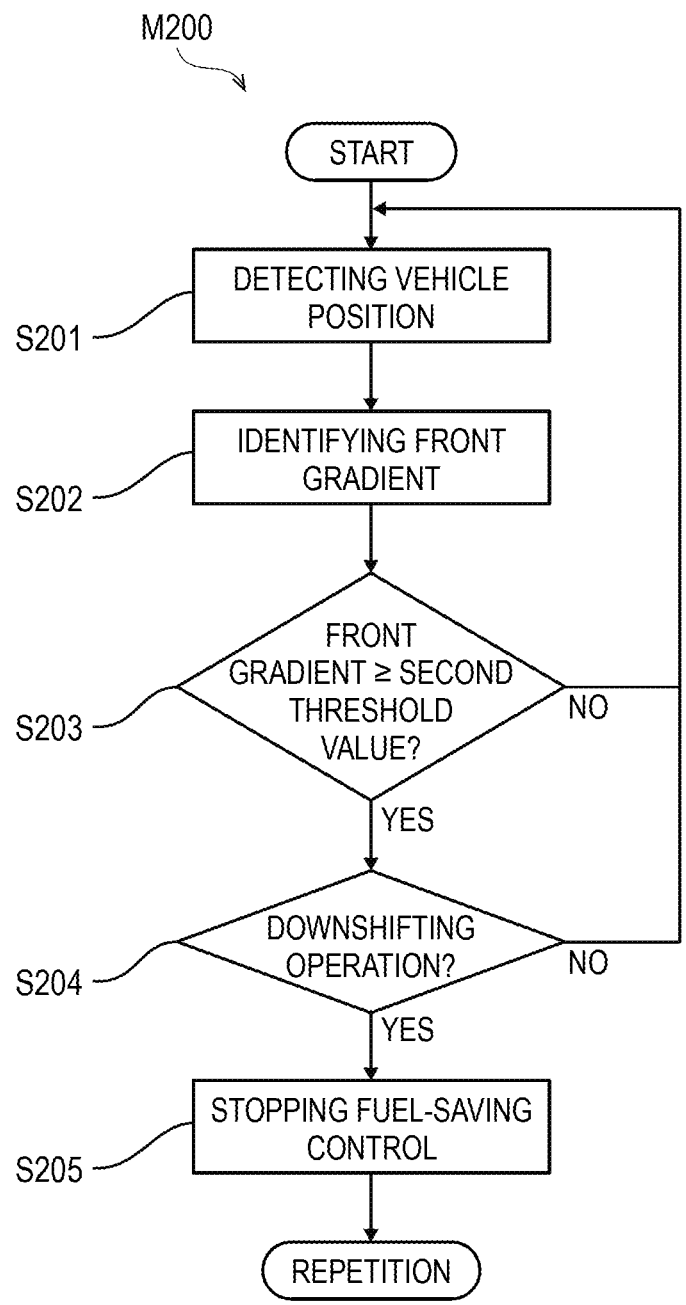
FIG. 3 is a flow chart of an extended fuel-saving control method of a fuel-saving control method according to an embodiment of the present disclosure.

Further, as shown in FIG. 3, the fuel-saving control method according to the embodiment of the present disclosure includes an extended fuel-saving control method M200 to be executed by the fuel-saving control device 100 after the ignition key is turned on. The extended fuel-saving control method M200 includes a vehicle position detection step S201, a front gradient identification step S202, a front gradient determination step S203, a downshifting operation determination step S204, and a second fuel-saving control stop step S205.

In the vehicle position detection step S201, the vehicle position detection unit 107 detects the vehicle position. In the front gradient identification step S202, the front gradient identification unit 110 identifies the front gradient based on the vehicle position and the map information. In the front gradient determination step S203, the fuel-saving control unit 102 determines whether the front gradient is the ascending gradient equal to or greater than the second threshold value. When the front gradient is the ascending gradient equal to or greater than the second threshold value, the method proceeds to the downshifting operation determination step S204, whereas when the front gradient is not the ascending gradient equal to or greater than the second threshold value, the method returns to the vehicle position detection step S201. In the downshifting operation determination step S204, it is determined whether the downshifting operation has been detected by the downshifting operation detection unit 109. When the downshifting operation has been detected, the method proceeds to the second fuel-saving control stop step S205, whereas when the downshifting operation has not been detected, the method returns to the vehicle position detection step S201. In the second fuel-saving control stop step S205, the fuel-saving control unit 102 stops the fuel-saving control even if the surplus driving force does not become smaller than the first threshold value. Also, while the second fuel-saving control stop step S205 is being executed, the control loop of the basic fuel-saving control method M100 is stopped and the extended fuel-saving control method M200 is prioritized. Alternatively, in the second fuel-saving control stop step S205, the fuel-saving control may be stopped by decreasing the correction value under the fuel-saving control step by step or continuously as the front gradient increases.

Further, the extended fuel-saving control method M200 may further include a between-vehicle-and-gradient distance calculation step for calculating a distance between the vehicle position and the gradient start position of the front gradient based on the vehicle position and the map information. Thus, when the distance between the vehicle position and the gradient start position of the front gradient is equal to or greater than the third threshold value, the fuel-saving control may not be stopped, but continued in the second fuel-saving control stop step S205 even if the front gradient is the ascending gradient equal to or greater than the second threshold value and the downshifting operation has been detected. Thus, it is necessary to execute the between-vehicle-and-gradient distance calculation step prior to executing the second fuel-saving control stop step S205. Also, it is necessary to execute a between-vehicle-and-gradient distance determination step after executing the between-vehicle-and-gradient distance calculation step but prior to executing the second fuel-saving control stop step S205. In the between-vehicle-and-gradient distance determination step, it is determined whether the distance between the vehicle position and the gradient start position of the front gradient is smaller than a third threshold value. When the distance between the vehicle position and the gradient start position of the front gradient is smaller than the third threshold value, the method proceeds to the next step, whereas when the distance between the vehicle position and the gradient start position of the front gradient is equal to or greater than the third threshold value, the method proceeds to the surplus driving force calculation step S101.

As described above, in a case where the driver has an intention not to want the vehicle to stall after starting uphill-travelling since the front gradient is the ascending gradient equal to or greater than the second threshold value and the vehicle is highly likely to stall after starting uphill-travelling, the fuel-saving control is stopped even before starting uphill-travelling regardless of the magnitude of the surplus driving force. Therefore, since the fuel-saving control is stopped before the surplus driving force is actually reduced by the vehicle starting uphill-travelling, the vehicle hardly stalls after starting uphill-travelling, and thus the convenience of the driver is hardly impaired. Also, in a case where the driver does not has an intention not to want the vehicle to be stalled after starting uphill-travelling, the fuel-saving control is not stopped but continued even if the front gradient is the ascending gradient equal to or greater than the second threshold value, thereby ensuring the convenience of the driver without sacrificing the fuel consumption performance of the vehicle. Further, the vehicle can smoothly travel on an uphill road without stalling by a sufficient driving force required for uphill-travelling. As a result, it is no longer necessary for the driver to unnecessarily step an accelerator pedal, thereby enhancing the fuel-saving performance of the vehicle.

Meanwhile, since one condition for stopping the fuel-saving control is detection of the downshifting operation, the present disclosure targets on manual transmission vehicles in principle. However, the present disclosure may be applied to automatic transmission vehicles, in which the downshifting operation can be performed depending on an intention of the driver (for example, automatic transmission vehicles equipped with a paddle shift or semi-automatic transmission vehicles preforming a foreseen shift control by using the map information). In particular, in the case of the manual transmission vehicles, it is possible to urge the driver to perform upshifting in advance by limiting an accelerating force of the vehicle. As a result, it is possible to greatly enhance the fuel-saving performance of the vehicle by executing the fuel-saving control.

This application is based on Japanese Patent Application No. 2016-200897 filed on Oct. 12, 2016, the entire contents of which are incorporated herein by reference.

INDUSTRIAL APPLICABILITY

The present disclosure has effects that the vehicle hardly stalls after starting uphill-traveling and thus the convenience of the driver can be improved while maintaining the fuel-saving performance of the vehicle, and is useful for a fuel-saving control device and a fuel-saving control method and the like.

REFERENCE SIGNS LIST

100: Fuel-saving control device
101: Surplus driving force calculation unit
102: Fuel-saving control unit
103: Controller
104: Accelerator position sensor
105: Instructed fuel injection amount calculation unit
106: Fuel injector
107: Vehicle position detection unit
108: Map information storage unit
109: Downshifting operation detection unit
110: Front gradient identification unit
111: Shift (gear) position sensor
112: Shift (gear) position monitoring unit
113: Between-vehicle-and-gradient distance calculation unit
M100: Basic fuel-saving control method
S101: Surplus driving force calculation step
S102: Surplus driving force determination step
S103: Fuel-saving control execution step
S104: First fuel-saving control stop step
M200: Extended fuel-saving control method
S201: Vehicle position detection step
S202: Front gradient identification step
S203: Front gradient determination step
S204: Downshifting operation determination step
S205: Second fuel-saving control stop step

The invention claimed is:
1. A fuel-saving control device, comprising:
a surplus driving force calculation unit for calculating a surplus driving force;

a fuel-saving control unit configured to execute a fuel-saving control for lowering and correcting an instructed fuel injection amount depending on an accelerator position when the surplus driving force becomes equal to or greater than a first threshold value, and configured to stop the fuel-saving control when the surplus driving force becomes smaller than the first threshold value, a vehicle position detection unit for detecting a vehicle position;

a map information storage unit for storing map information;

a downshifting operation detection unit for detecting a downshifting operation; and a front gradient identification unit for identifying a front gradient based on the vehicle position and the map information, wherein the fuel-saving control unit is configured to stop the fuel-saving control even if the surplus driving force does not become smaller than the first threshold value, when the front gradient is an ascending gradient equal to or greater than a second threshold value and the downshifting operation has been detected, and wherein, when the front gradient is the ascending gradient equal to or greater than the second threshold value and the downshifting operation has been detected, the fuel-saving control unit is further configured to stop the fuel-saving control by decreasing a correction value under the fuel-saving control step by step or continuously in response to increment of the front gradient from the second threshold value to a value at which the fuel-saving control is stopped.

2. The fuel-saving control device according to claim 1, further comprising:

a between-vehicle-and-gradient distance calculation unit for calculating a distance between the vehicle position and the front gradient based on the vehicle position and the map information, wherein the fuel-saving control unit is further configured to continue the fuel-saving control even if the front gradient is the ascending gradient equal to or greater than the second threshold value and the downshifting operation has been detected, when a distance between the vehicle position and a gradient start position of the front gradient is equal to or greater than a third threshold value.

3. A fuel-saving control method, comprising:

calculating a surplus driving force;

executing a fuel-saving control for lowering and correcting an instructed fuel injection amount depending on an accelerator position when the surplus driving force becomes equal to or greater than a first threshold value;

stopping the fuel-saving control when the surplus driving force becomes smaller than the first threshold value, detecting a vehicle position;

identifying a front gradient based on the vehicle position and map information; and stopping the fuel-saving control even if the surplus driving force does not become smaller than the first threshold value, when the front gradient is an ascending gradient equal to or greater than a second threshold value and a downshifting operation has been detected, wherein in a case where the fuel-saving control is stopped even if the surplus driving force does not become smaller than the first threshold value, the fuel-saving control is stopped by decreasing a correction value under the fuel-saving control step by step or continuously in response to increment of the front gradient from the second threshold value to a value at which the fuel-saving control is stopped, when the front gradient is the ascending gradient equal to or greater than the second threshold value and the downshifting operation has been detected.

4. The fuel-saving control method according to claim 3, further comprising:

calculating a distance between the vehicle position and a gradient start position of the front gradient based on the vehicle position and the map information, wherein in a case where the fuel-saving control is stopped even if the surplus driving force does not become smaller than the first threshold value, the fuel-saving control is continued even if the front gradient is the ascending gradient equal to or greater than the second threshold value and the downshifting operation has been detected, when the distance between the vehicle position and the gradient start position of the front gradient is equal to or greater than a third threshold value.

5. A fuel-saving control device, comprising:

a vehicle position detector that detects a vehicle position;

a map information storage that stores map information;

a downshifting operation detector that detects a downshifting operation, and a controller configured to:

calculate a surplus driving force;

execute a fuel-saving control for lowering and correcting an instructed fuel injection amount depending on an accelerator position when the surplus driving force becomes equal to or greater than a first threshold value;

stop the fuel-saving control when the surplus driving force becomes smaller than the first threshold value; and identify a front gradient based on the vehicle position and the map information, wherein the controller is configured to stop the fuel-saving control even if the surplus driving force does not become smaller than the first threshold value, when the front gradient is an ascending gradient equal to or greater than a second threshold value and the downshifting operation has been detected, and wherein, when the front gradient is the ascending gradient equal to or greater than the second threshold value and the downshifting operation has been detected, the fuel-saving controller is configured to stop the fuel-saving control by decreasing a correction value under the fuel-saving control step by step or continuously in response to increment of the front gradient from the second threshold value to a value at which the fuel-saving control is stopped.

6. The fuel-saving control device according to claim 2, wherein the third threshold value is set to be longer as the front gradient increases.

7. The fuel-saving control method according to claim 4, wherein the third threshold value is set to be longer as the front gradient increases.

* * * * *